US010911994B2

(12) United States Patent
Chauhan et al.

(10) Patent No.: US 10,911,994 B2
(45) Date of Patent: Feb. 2, 2021

(54) METHOD AND SYSTEM FOR END DEVICE MANAGEMENT OF VOICE OVER NEW RADIO AND NON-VOICE OVER NEW RADIO IN MULTI-RAT ENVIRONMENT

(71) Applicant: Verizon Patent and Licensing Inc., Arlington, VA (US)

(72) Inventors: Maqbool Chauhan, Keller, TX (US); Imtiyaz Shaikh, Irving, TX (US); Lalit R. Kotecha, San Ramon, CA (US); Sudhakar Reddy Patil, Flower Mound, TX (US); Robert Avanes, Roanoke, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/398,587

(22) Filed: Apr. 30, 2019

(65) Prior Publication Data
US 2020/0351726 A1 Nov. 5, 2020

(51) Int. Cl.
*H04W 36/00* (2009.01)
*H04W 48/04* (2009.01)
*H04W 48/16* (2009.01)
*H04W 76/15* (2018.01)

(52) U.S. Cl.
CPC ....... *H04W 36/0069* (2018.08); *H04W 48/04* (2013.01); *H04W 48/16* (2013.01); *H04W 76/15* (2018.02)

(58) Field of Classification Search
CPC . H04W 36/0069; H04W 76/15; H04W 48/04; H04W 48/16
See application file for complete search history.

(56) References Cited

U.S. PATENT DOCUMENTS

| 2019/0007877 | A1* | 1/2019 | Keller | H04W 76/16 |
| 2019/0159074 | A1* | 5/2019 | Velev | H04W 76/27 |
| 2019/0191349 | A1* | 6/2019 | Kim | H04W 36/0022 |
| 2019/0281647 | A1* | 9/2019 | Chiang | H04W 36/0022 |
| 2019/0394245 | A1* | 12/2019 | Niemi | H04L 65/40 |
| 2020/0068647 | A1* | 2/2020 | Jha | H04W 76/16 |
| 2020/0112892 | A1* | 4/2020 | Shi | H04L 65/1073 |
| 2020/0120485 | A1* | 4/2020 | Abtin | H04W 8/24 |

* cited by examiner

*Primary Examiner* — Habte Mered

(57) ABSTRACT

A method, a device, and a non-transitory storage medium are described in which an multi-RAT voice management service is provided. The service includes transmitting data to a wireless station that indicates an end device capability for a voice service of a radio access technology of the wireless station. The data may be included in radio access technology frequency selection priority data. When a voice call is initiated, the wireless station may determine whether to invoke an inter-radio access technology fallback procedure based on the received data.

20 Claims, 13 Drawing Sheets

METHOD AND SYSTEM FOR END DEVICE MANAGEMENT OF VOICE OVER NEW RADIO AND NON-VOICE OVER NEW RADIO IN MULTI-RAT ENVIRONMENT

BACKGROUND

Development and design of radio access networks (RAN) and core networks present certain challenges from a network-side perspective and an end device perspective. For example, depending on the configurations from both network-side and end device-side perspectives, such configurations may reduce the effective use of resources. Accordingly, a need exists to overcome these challenges.

DETAILED DESCRIPTION OF PREFERRED EMBODIMENTS

Figure 1:
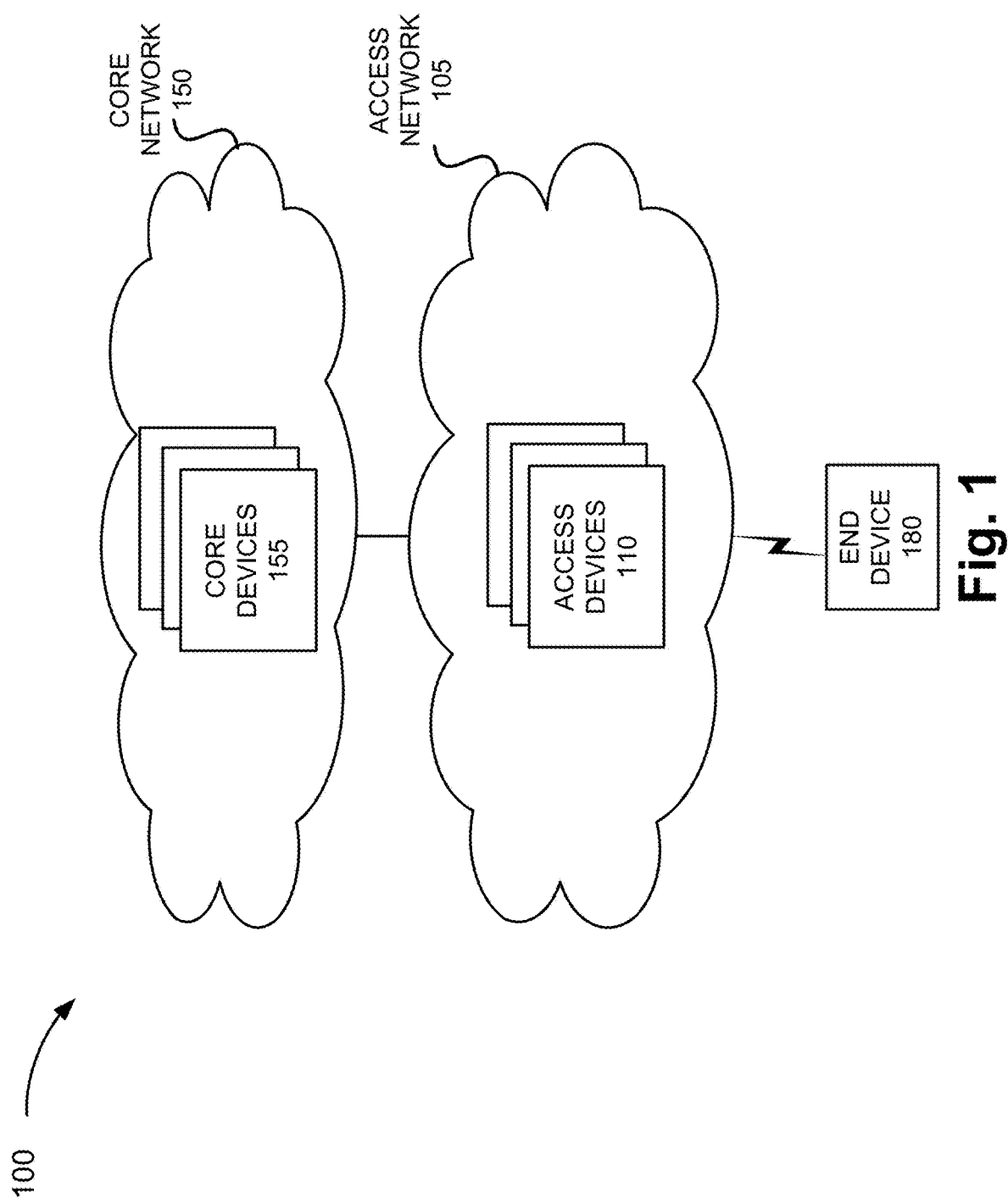
FIG. 1 is a diagram illustrating an exemplary environment in which an exemplary embodiment of a multi-radio access technology (RAT) voice management service may be implemented.

The following detailed description refers to the accompanying drawings. The same reference numbers in different drawings may identify the same or similar elements. Also, the following detailed description does not limit the invention.

When an end device is anchored in a Fifth Generation (5G) core network, and subsequently originates or receives a voice call, a next generation Node B (gNB) may trigger an Evolved Packet System (EPS) voice fallback procedure. The EPS voice fallback procedure may include handing over or redirecting the end device to the EPS. The gNB determines if the handover/redirect is to be performed on a per end device basis to support an "opt-in" mechanism. Consequently, information may need to be passed to the gNB from a device of the 5G core network (e.g., a User Data Management (UDM) via an Access and Management Function (AMF)) to indicate if the handover/redirect is to be triggered for the end device and the voice session.

During the execution of the EPS voice fallback procedure of the end device, an evolved Node B (eNB) or other wireless station of the EPS will make differentiations between when an end device is being served because of coverage reasons versus another reason, such as EPS voice fallback. The eNB will retrieve a measurement report from the end device pertaining to 5G radio coverage. Based on the measurement report, the eNB will trigger a handover for the end device that is being served because of coverage reasons. However, the eNB may not trigger a handover for the end device that is being served because of EPS voice fallback reasons.

Also, after EPS voice fallback and voice call completion, the end device may require proper RAT/Frequency Selection and Prioritization (RFSP) information for managing idle mode camping and controlling of inter-RAT/inter-frequency handover while in active mode.

According to exemplary embodiments, a multi-RAT voice management service is described. According to an exemplary embodiment, the multi-RAT voice management service includes a message that can indicate end device voice capabilities. For example, the message may include data that indicates whether an end device is voice over new radio (VoNR) capable or not (e.g., non-VoNR capable). For example, VoNR capable may mean that the end device is capable of having a voice session in a NR standalone (SA) (also known as option 2) architecture. According to an exemplary embodiment, the multi-RAT voice management service message may be communicated to a wireless station (e.g., eNB, gNB, etc.) of a radio access network (RAN). The wireless station (e.g., gNB) may determine if an EPS voice fallback procedure is to be invoked based on the message. Additionally, for example, the eNB may determine if the end device supports VoNR or not. In this way, if the eNB determines that there is suitable 5G coverage during a Voice over Long Term Evolution (VoLTE) but the end device is not VoNR capable, the eNB does not initiate a handover of the end device to a 5G RAN device.

As a result, the multi-RAT voice management service may improve network resource utilization in a network. For example, the multi-RAT voice management service may improve the use of various network resources (e.g., physical, logical, virtual, radio) in relation to network devices of a RAN or network devices of the RAN and a core network that may stem from unnecessary signaling. Additionally, the multi-RAT voice management service may improve resource utilization and quality of service at the end device for similar reasons, as well as saving battery power.

FIG. 1 is a diagram illustrating an exemplary environment 100 in which an exemplary embodiment of the multi-RAT voice management service may be implemented. As illustrated, environment 100 includes an access network 105 and a core network 150. Access network 105 includes access devices 110, and core network 150 includes core devices 155. Environment 100 further includes an end device 180.

The number, the type, and the arrangement of network devices in access network 105 and core network 150, as illustrated and described, are exemplary. The number of end devices 180 is exemplary. A network device, a network element, or a network function (referred to herein simply as a network device) may be implemented according to one or multiple network architectures (e.g., a client device, a server device, a peer device, a proxy device, a cloud device, a virtualized function, and/or another type of network architecture (e.g., Software Defined Networking (SDN), virtual, logical, network slicing, etc.)). Additionally, a network device may be implemented according to various computing architectures, such as centralized, distributed, cloud (e.g., elastic, public, private, etc.), edge, fog, and/or another type of computing architecture.

Environment 100 includes communication links between the network devices, and between end device 180 and network devices. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Environment 100 may include various planes of communication including, for example, a control plane, a user plane, and a network management plane. Environment 100 may include other types of planes of communication. A message communicated in support of the multi-RAT voice management service may use at least one of these planes of communication. Additionally, an interface of a network device may be modified relative to an existing interface (e.g., an interface defined by a standards body, such as Third Generation Partnership Project (3GPP), International Telecommunication Union (ITU), European Telecommunications Standards Institute (ETSI), etc.) in order to support the communication (e.g., transmission and reception of messages, information elements (IE), attribute value pairs (AVPs), etc.) between network devices and the multi-RAT voice management service, as described herein. According to various exemplary implementations, the interface may be a service-based interface or a reference point-based interface.

Access network 105 may include multiple networks of multiple types and technologies. For example, access network 105 may include a Fourth Generation (4G) RAN, a 4.5G RAN, a Fifth Generation (5G) RAN, and/or another type of future generation RAN. By way of further example, access network 105 may be implemented to include an Evolved UMTS Terrestrial Radio Access Network (E-UTRAN) of a Long Term Evolution (LTE) network, an LTE-Advanced (LTE-A) network, and/or an LTE-A Pro network, and a next generation (NG) RAN. Access network 105 may further include other types of wireless networks, such as a WiFi network, a Worldwide Interoperability for Microwave Access (WiMAX) network, a local area network (LAN), or another type of network (e.g., a legacy Third Generation (3G) RAN, etc.) that may provide an on-ramp to access devices 110 and/or core network 150.

According to various exemplary embodiments, access network 105 may be implemented to include various architectures of wireless service, such as, for example, macrocell, microcell, femtocell, picocell, metrocell, NR cell, LTE cell, non-cell, or another type of cell architecture. Additionally, according to various exemplary embodiments, access network 105 may be implemented according to various wireless technologies (e.g., RATs, etc.), wireless standards, wireless frequencies/bands/carriers, licensed radio spectrum, unlicensed radio spectrum, and/or other attributes of radio communication.

Access network 105 may include different and multiple functional splitting, such as options 1, 2, 3, 4, 5, 6, 7, or 8 that relate to combinations of access network 105 and core network 150 including an Evolved Packet Core (EPC) network and/or a NG core (NGC) network, or the splitting of the various layers (e.g., physical layer, Media Access Control (MAC) layer, Radio Link Control (RLC) layer, and Packet Data Convergence Control (PDCP) layer), plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), CA (e.g., intra-band, inter-band, contiguous, non-contiguous, etc.), network slicing, coordinated multipoint (CoMP), various duplex schemes (e.g., frequency division duplex (FDD), time division duplex (TDD), half-duplex FDD (H-FDD), etc.), and/or another type of connectivity service.

Depending on the implementation, access network 105 may include one or multiple types of network devices, such as access devices 110. For example, access devices 110 may include an eNB, a gNB, an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.), or another type of wireless node. According to an exemplary embodiment, access device 110 includes logic that provides the multi-RAT voice management service, as described herein.

Core network 150 may include multiple networks of multiple types and technologies. According to an exemplary embodiment, core network 150 includes a complementary network of access network 105. For example, core network 150 may be implemented to include an EPC of an LTE, a core network of an LTE-Advanced (LTE-A) network, and/or a core network of an LTE-A Pro network, and a next generation core (NGC) network. Core network 150 may include a legacy core network.

Depending on the implementation, core network 150 may include various types of network devices, such as core devices 155. For example, core devices 155 may include a packet gateway (PGW), a serving gateway (SGW), a home subscriber server (HSS), an authentication, authorization, and accounting (AAA) server, a policy charging and rules function (PCRF), a charging system (CS), a user plane function (UPF), an AMF, a mobility management entity (MME), a session management function (SMF), a unified data management (UDM) device, an authentication server function (AUSF), a network slice selection function (NSSF), a network repository function (NRF), a policy control function (PCF), a network exposure function (NEF), and/or an application function (AF). According to other exemplary implementations, core devices 155 may include additional, different, and/or fewer network devices than those described. For example, core devices 155 may include a non-standard and/or proprietary network device. According to an exemplary embodiment, core device 155 includes logic that provides the multi-RAT voice management service, as described herein.

End device 180 includes a device that has computational and wireless communication capabilities. Depending on the implementation, end device 180 may be a mobile device, a portable device, a stationary device, a device operated by a user, or a device not operated by a user. For example, end device 180 may be implemented as a Mobile Broadband device, a Machine Type Communication (MTC) device, an Internet of Things (IoT) device, an enhanced MTC device (eMTC) (also known as Cat-M1), a NarrowBand IoT (NB-IoT) device, a machine-to-machine (M2M) device, a user device, or other types of wireless end nodes. By way of further example, end device 180 may be implemented as a smartphone, a personal digital assistant, a tablet, a netbook, a phablet, a wearable device (e.g., a watch, glasses, etc.), a set top box, an infotainment system in a vehicle, a vehicle support system, a smart television, a game system, a music playing system, or other types of wireless end devices. End device 180 may be configured to execute various types of software (e.g., applications, programs, etc.). The number and the types of software may vary among end devices 180.

End device 180 may support multiple RATs (e.g., 4G, 5G, future RAT, etc.) and various portions of the radio spectrum (e.g., multiple frequency bands, multiple carrier frequencies, licensed, unlicensed, etc.), network slicing, DC service, and/or other types of connectivity services. Additionally, end device 180 may include one or multiple communication interfaces that provide one or multiple (e.g., simultaneous) connections via the same or different RATs, frequency bands, carriers, network slices, and so forth. The multimode capabilities of end device 180 may vary among end devices 180. According to an exemplary embodiment, end device 180 includes logic that provides the multi-RAT voice management service, as described herein. According to an exemplary embodiment, end device 180 may support VoNR, non-VoNR (e.g., VoLTE), or both. According to some exemplary embodiments, when end device 180 supports both VoNR and non-VoNR, subscription information may indicate a preference of VoNR over non-VoNR or vice versa.

Figure 2:
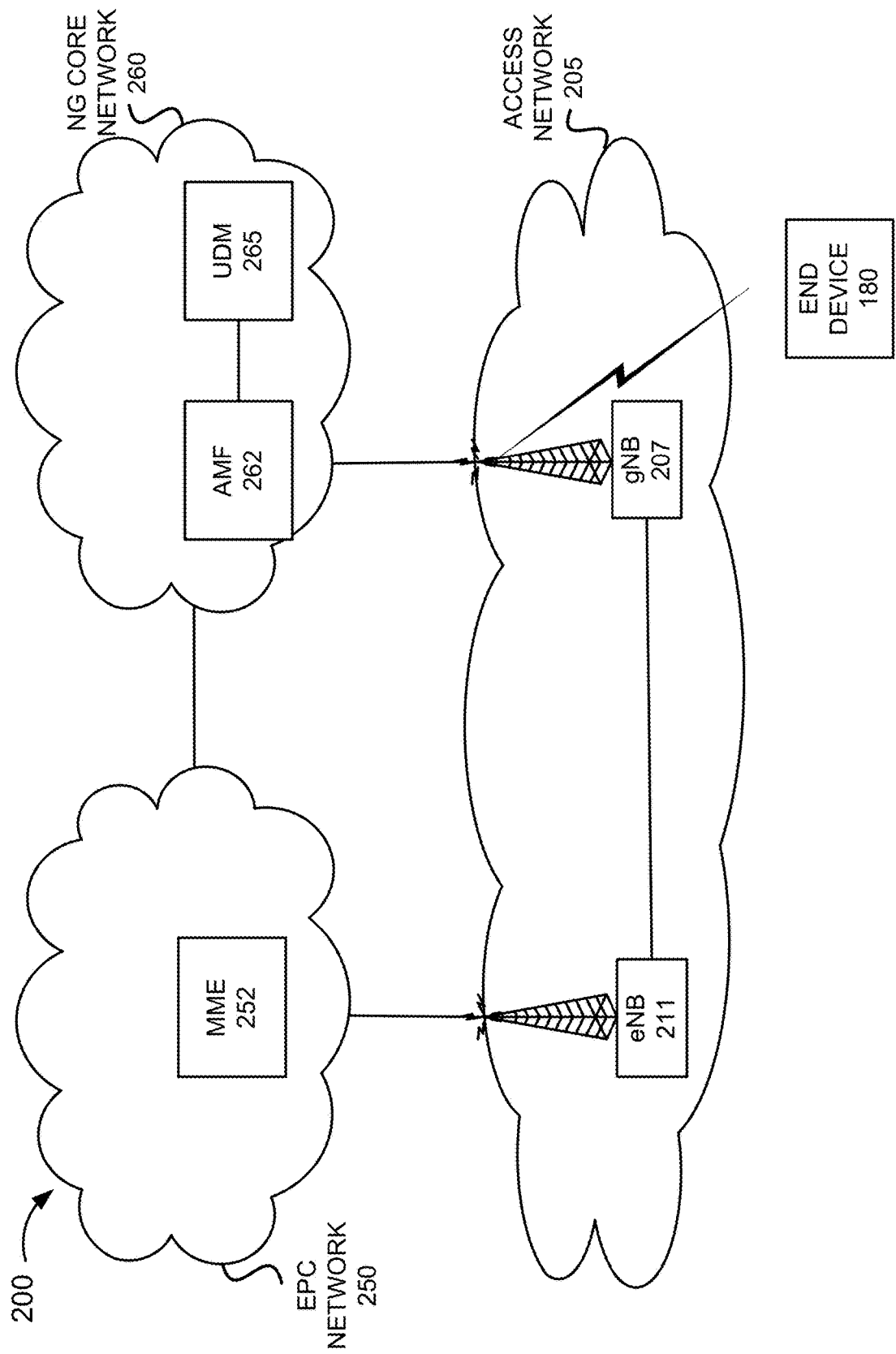
FIG. 2 is a diagram illustrating another exemplary environment in which an exemplary embodiment of the multi-RAT voice management service may be implemented.

FIG. 2 is a diagram illustrating an exemplary environment 200 in which an exemplary embodiment of the multi-RAT voice management service may be implemented. As illustrated, environment 200 includes an access network 205, an EPC network 250, and a NGC network 260. Access network 205 includes a gNB 207 and an eNB 211. EPC network 250 includes an MME 252, and NG Core network includes an AMF 262 and a UDM 265. As previously described in relation to environment 100, the number of network devices, the type of network devices, the communication links, and so forth, in environment 200 are exemplary.

Figure 3A:
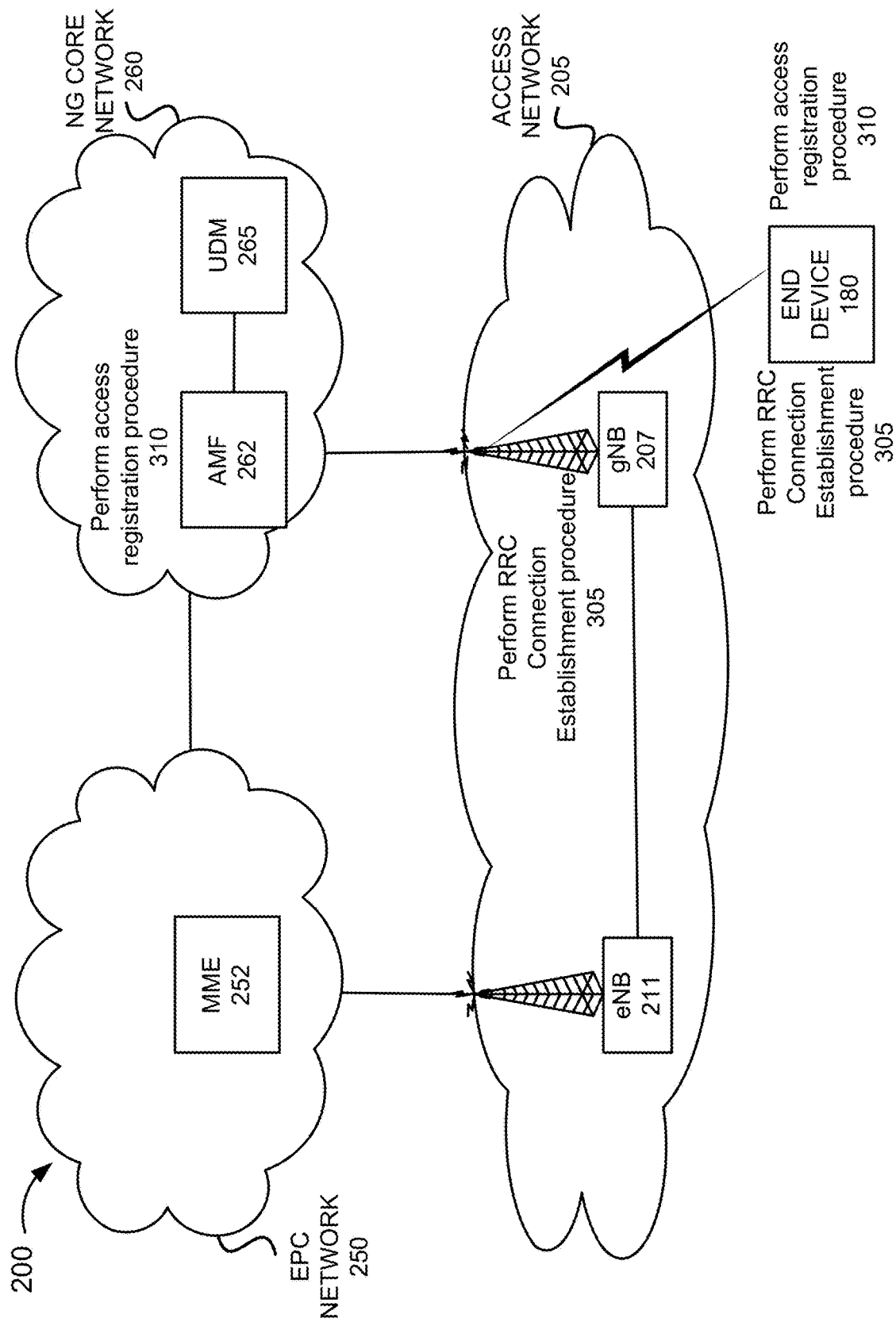
FIGS. 3A-3G are diagrams illustrating an exemplary process of an exemplary embodiment of the multi-RAT voice management service.
Figure 3B:
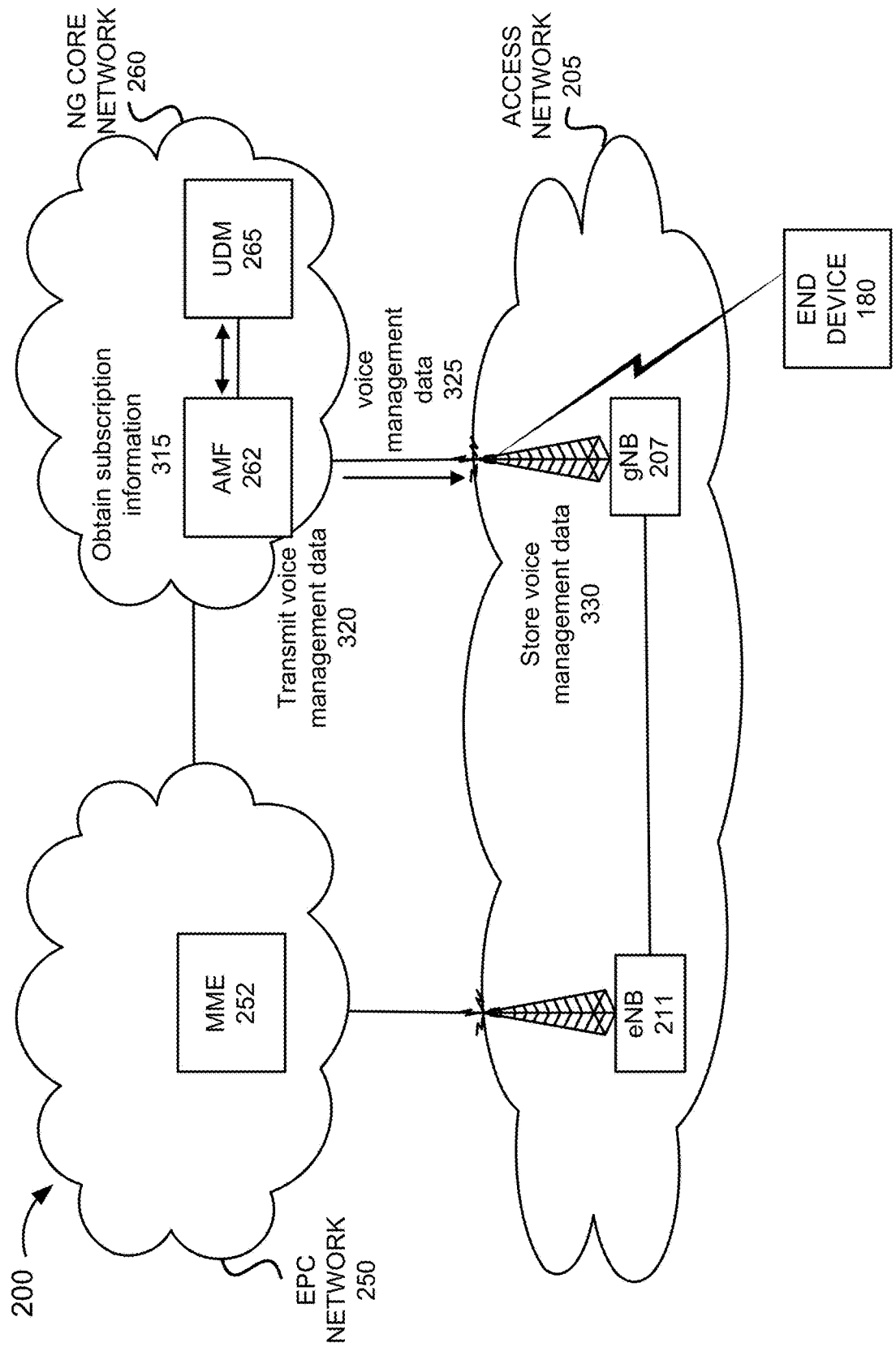

FIGS. 3A-3G are diagrams illustrating an exemplary process of an exemplary embodiment of the multi-RAT voice management service. Referring to FIG. 3A, according to an exemplary scenario, assume that end device 180 establishes a radio resource control (RRC) connection with gNB 207 based on an RRC Connection Establishment procedure 305. Subsequently, end device 180 and NG core network 260 may perform an access registration procedure 310. Referring to FIG. 3B, during the procedure, AMF 262 may obtain, from UDM 265, subscription information 315 pertaining to end device 180. According to an exemplary embodiment, the subscription information includes voice management data, as described herein. For example, the voice management data may indicate whether end device 180 supports VoNR or non-VoNR (e.g., a binary choice). Alternatively, for example, the voice management data may indicate a subscription preference when end device 180 supports both VoNR and non-VoNR. Thereafter, AMF 262 may transmit the voice management data 320 to gNB 207. According to an exemplary implementation, a voice management data 325 may be included in an Initial Context Setup message. According to another exemplary implementation, voice management data 325 may be included in RAT/Frequency Selection Priority (RFSP) data or another type of message. An exemplary embodiment of the RFSP data is described further below in relation to FIG. 4.

Figure 4:
FIG. 4 is a diagram illustrating an exemplary embodiment of voice management data.

FIG. 4 is a diagram illustrating an exemplary embodiment of RFSP data that includes voice management data. According to an exemplary embodiment, RFSP data 400 may include an index value indicating a voice capability for end device 180. For example, the index value may indicate that end device 180 is VoNR capable, and another index value may indicate that end device 180 is non-VoNR capable. By way of further example, a subscriber profile identifier (SPID) IE may include RFSP data 400. According to an exemplary implementation, RFSP data 400 is included in an octet. For example, in an SPID IE, RFSP data 400 may be indicated in a fifth octet, a sixth octet, or another portion of the SPID IE. According to an exemplary implementation, a nibble of the byte (e.g., least significant bits of the octet) may indicate whether end device 180 is a non-VoNR device or a VoNR device. According to this example, the value of 4 indicates that end device 180 is a non-VoNR device, while the value of 5 indicates that end device 180 is a VoNR device. These values are exemplary and other values may be configured through use of the octet and/or a nibble to indicate whether end device 180 is a VoNR device or a non-VoNR device. According to yet other examples, another bit and/or value may be used to indicate a preference when end device 180 is both a VoNR and non-VoNR device capable. As an example, bit four or another bit of the nibble may indicate the preference, and another set of bits/value may indicate the dual capability of end device 180.

Figure 3C:
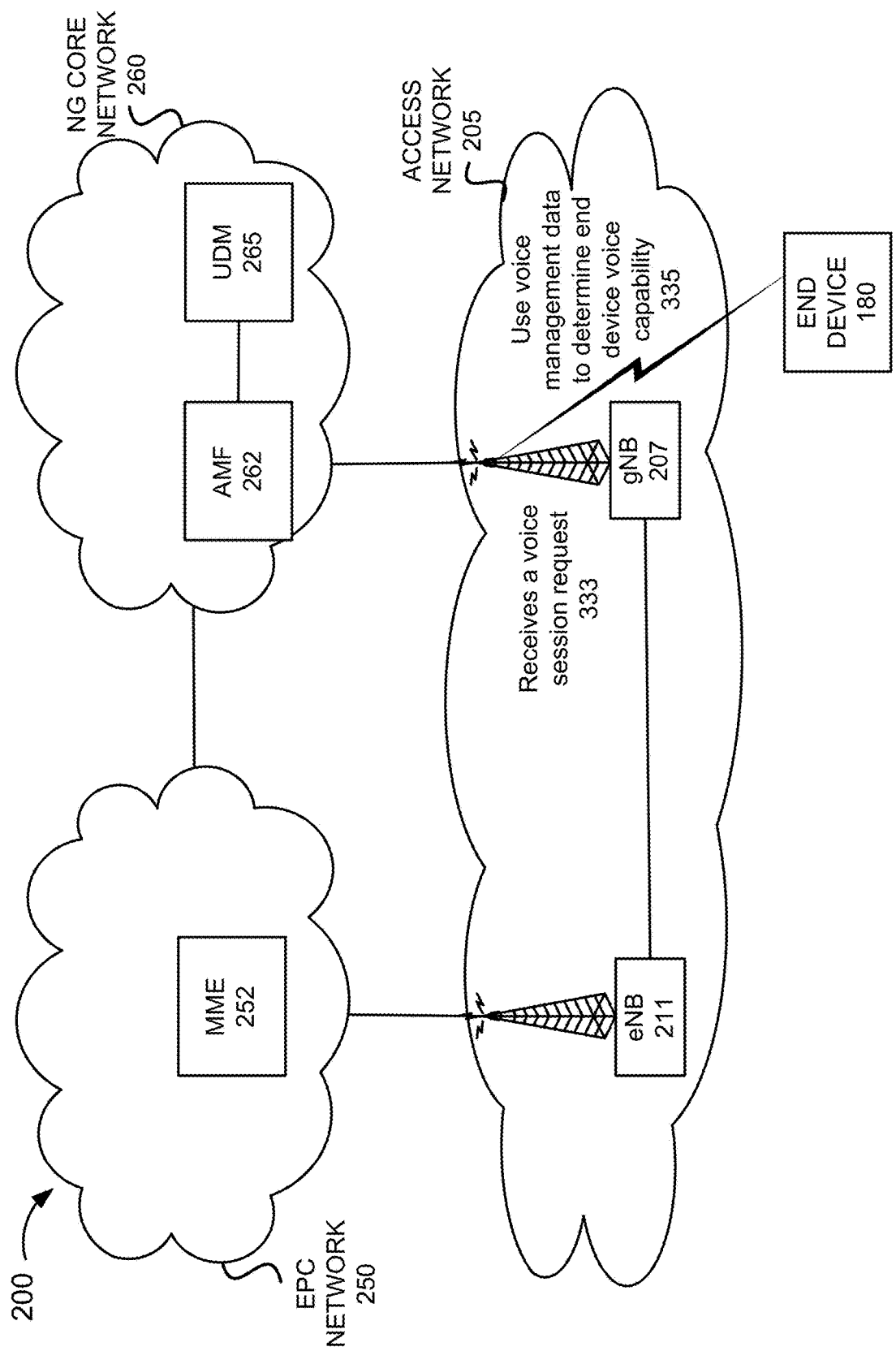

Referring back to FIG. 3B, in response to receiving the voice management data, gNB 207 may store the voice management data 330. Referring to FIG. 3C, subsequent to completion of the access registration procedure, gNB 207 may receive a voice session request 333. For example, the voice session request may be received from end device 180 (e.g., initiating a voice call, mobile originating (MO) voice call) or received from another end device 180 (e.g., a mobile terminating (MT) voice call) not illustrated. In response to receiving the voice session request, gNB 207 may use the voice management data to determine end device 180 voice capability 335. When the voice management data indicates that end device 180 is a VoNR capable device, gNB 207 may process the voice call according to VoNR procedures and configurations.

Figure 3D:
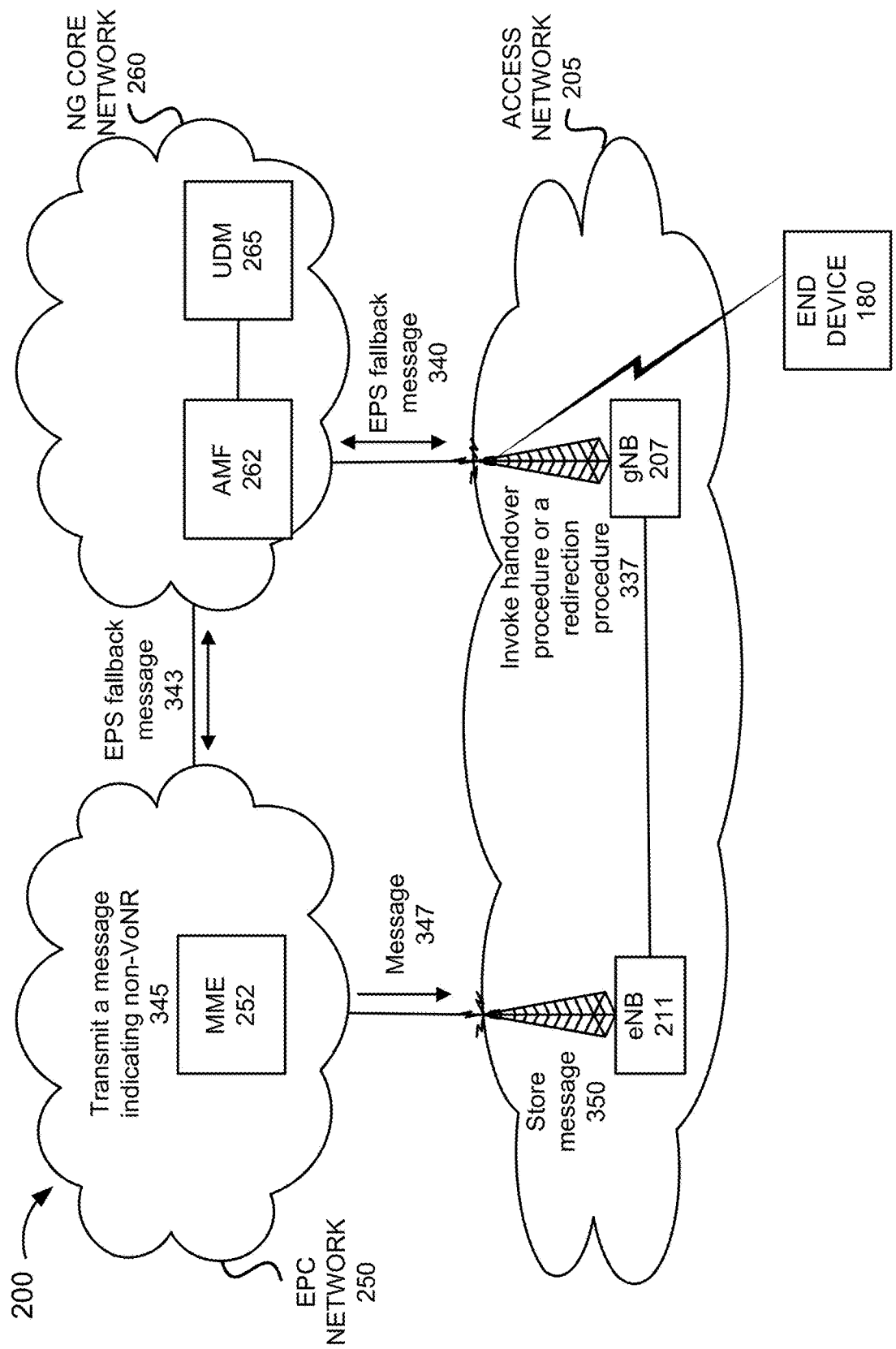

However, referring to FIG. 3D, when the voice management data indicates end device 180 is a non-VoNR capable device (or has a preference for non-VoNR), gNB 207 may invoke a handover procedure or a redirection procedure 337. For example, gNB 207 may invoke a handover procedure (e.g., an inter-RAT handover) with another access device 110 (e.g., eNB 211) of a RAT type that is not NR (e.g., non-VoNR). Alternatively, for example, gNB 207 may redirect end device 180 to a target access device 110 (e.g., eNB 211). According to this exemplary scenario, assume gNB 207 invokes a handover procedure with eNB 211 based on the voice management data.

As further illustrated, based on invoking the handover procedure, gNB 207 may execute an EPS voice fallback procedure. The EPS fallback procedure may include communication of an EPS fallback message 340 with AMF 262. In response to receiving the EPS fallback message, AMF 262 and MME 252 may perform an EPS fallback procedure, which may include communication of an EPS fallback message 343. EPS fallback message 343 may include the voice management data (e.g. RFSP data 400 or portion thereof (e.g., RFSP index value)). MME 252 may transmit a message, which includes the voice management data indicating that end device 180 is non-VoNR 345, to the target eNB 211. For example, message 347 may include RFSP data 400 or a portion thereof. In response to receiving the message, eNB 211 may store the message 350.

Figure 3E:
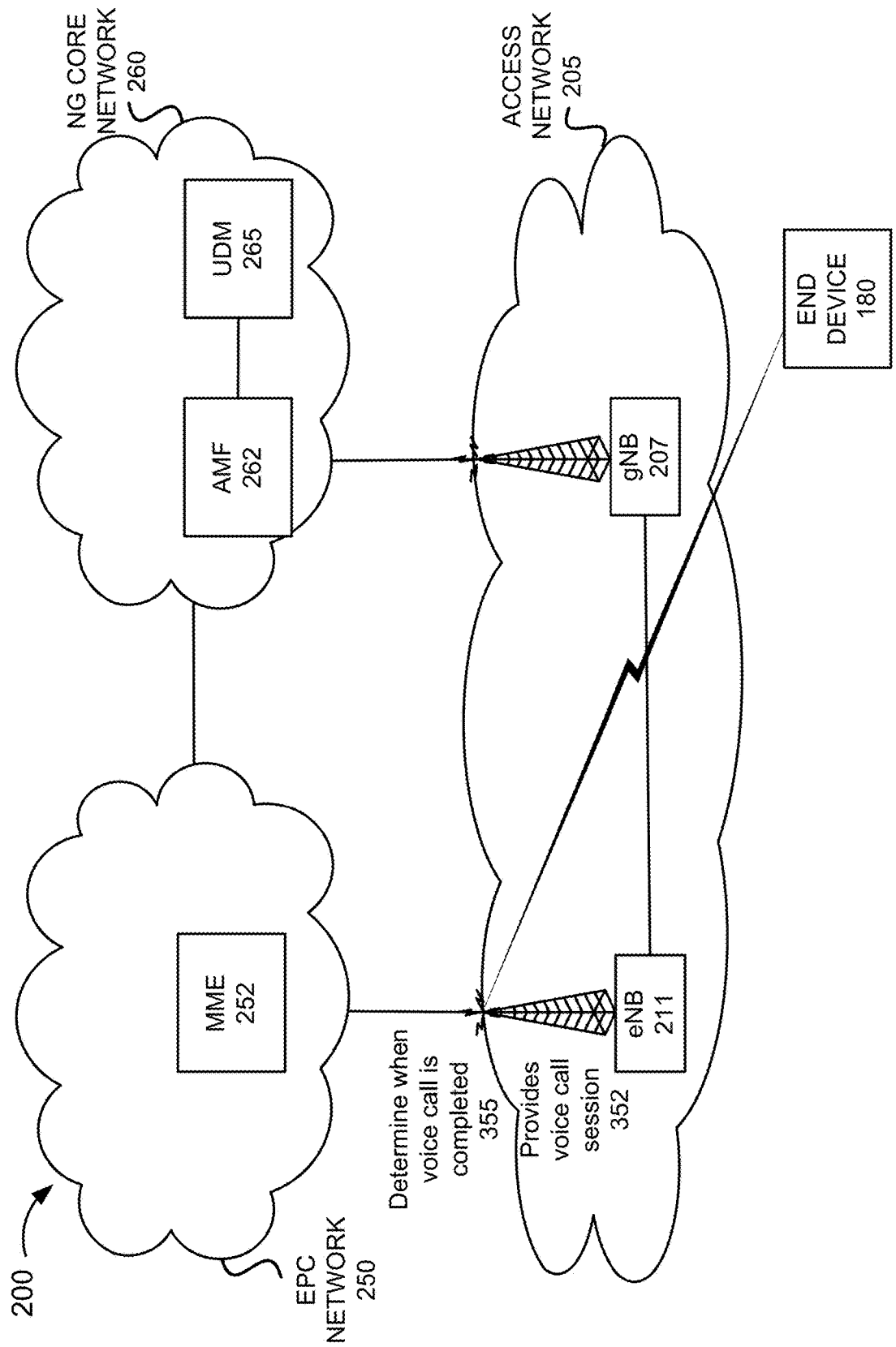

Referring to FIG. 3E, subsequent to the completion of the handover procedure, eNB 211 may provide wireless service that supports the voice call session 352. Additionally, eNB 211 may omit to redirect or handover end device 180 during the voice call session to a 5G RAN device (e.g., a gNB), based on the voice management data. This may be the case despite end device 180 reporting to eNB 211 of suitable 5G RAN coverage. As further illustrated, eNB 211 may monitor the voice call session and determine when the voice call session is completed 355.

Figure 3F:
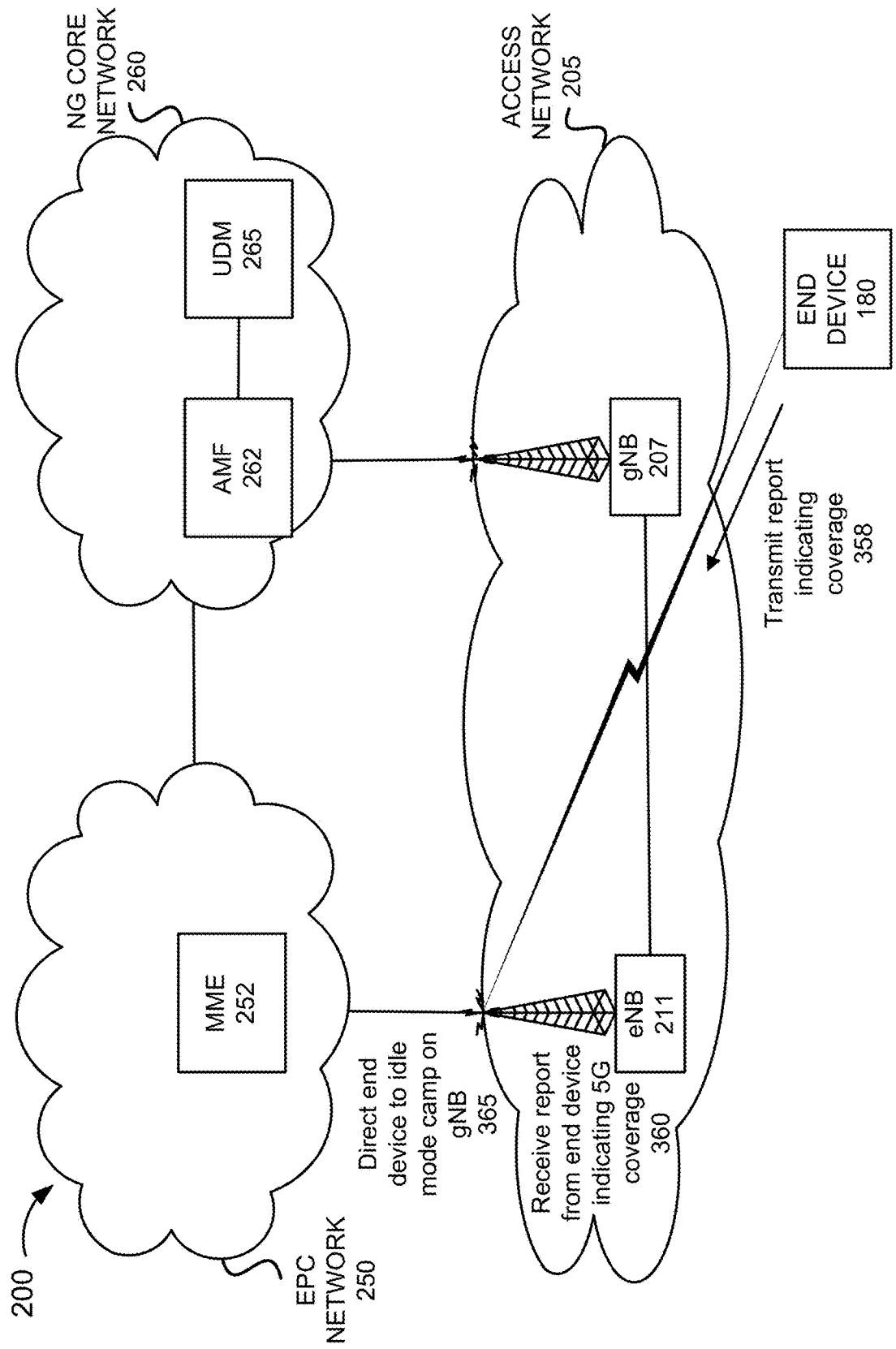

Referring to FIG. 3F, during and/or after the voice call session is completed, end device 180 may transmit a report (e.g., a measurement report) indicating radio coverage 358. For example, the report may indicate suitable 5G radio coverage. According to an exemplary scenario, eNB 211 may receive the report from end device 180, and analyze the report that indicates suitable 5G coverage 360. Subsequent to the completion of the voice call session and based on the report, eNB 211 may direct end device 180 to camp on a gNB 365. Alternatively, subsequent to the completion of the voice call, if a data session is to be established by end device 180, eNB 211 may direct end device 180 to camp on a neighboring gNB that provides the suitable 5G coverage. According to another exemplary scenario, however, if the report indicates that no suitable 5G coverage is available, eNB 211 may allow end device 180 to remain camped on eNB 211.

Figure 3G:
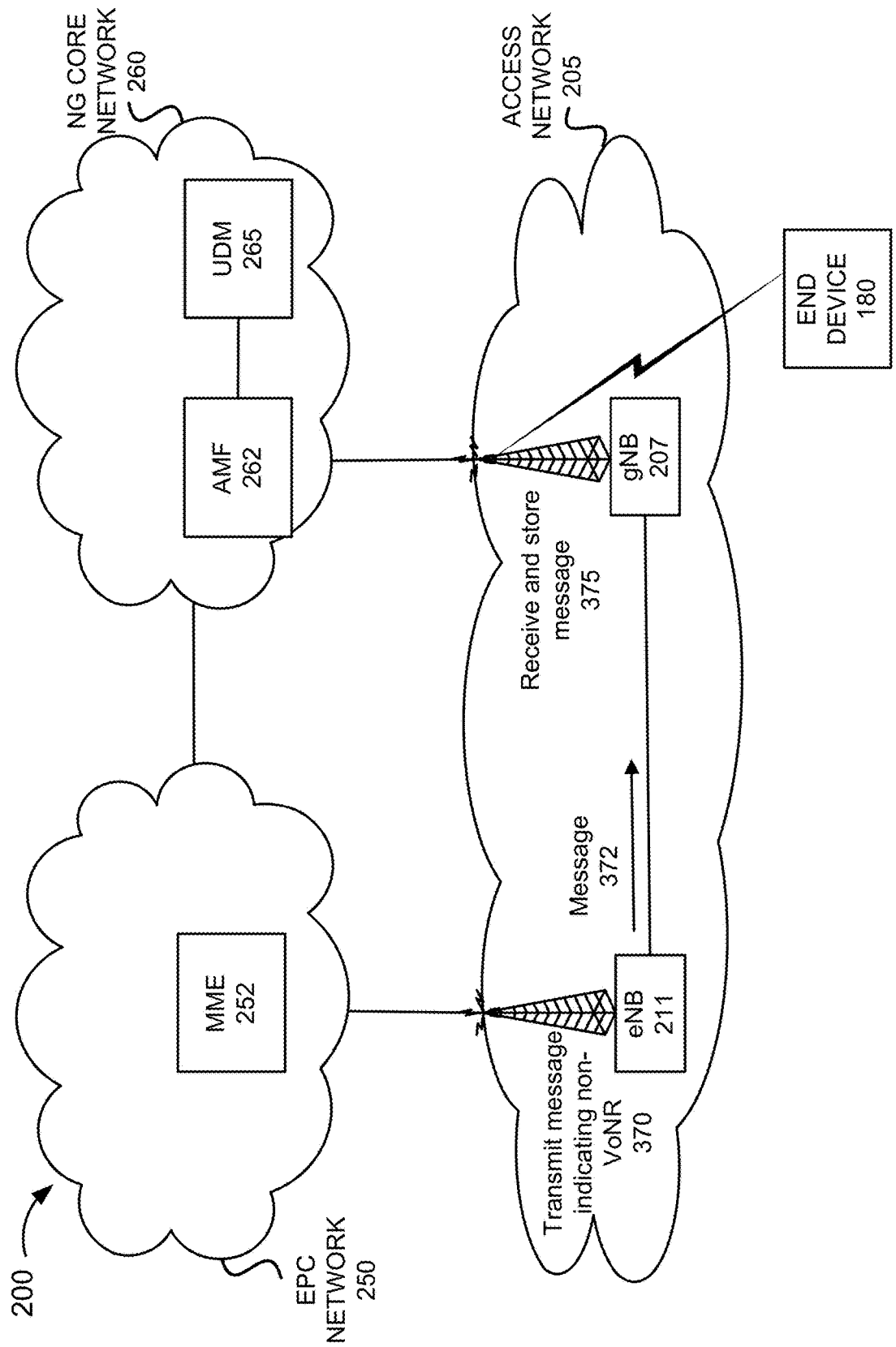

Referring to FIG. 3G, as part of a handover or redirect procedure, eNB 211 may transmit a message, which indicates non-VoNR 370, to a target gNB 207. For example, message 372 may include RFSP data 400 or portion thereof. gNB 207 receives and stores the message 375, and establishes a radio connection with end device 180. gNB 207 may use the voice management data for managing of voice sessions of end device 180.

FIGS. 3A-3G illustrate an exemplary process of the multi-RAT voice management service. However, according to other exemplary embodiments, the process may include additional, different, and/or fewer steps, and/or include additional, different, and/or fewer messages. For example, according to other exemplary scenarios with reference to FIG. 3C, end device 180 may have an active data session via gNB 207 before gNB 207 receives the voice session request. According to an exemplary implementation, gNB 207 may invoke the EPS voice fallback procedure and inter-RAT handover/redirect procedure with eNB 211. eNB 211 may manage both the data session and the voice session.

Figure 5:
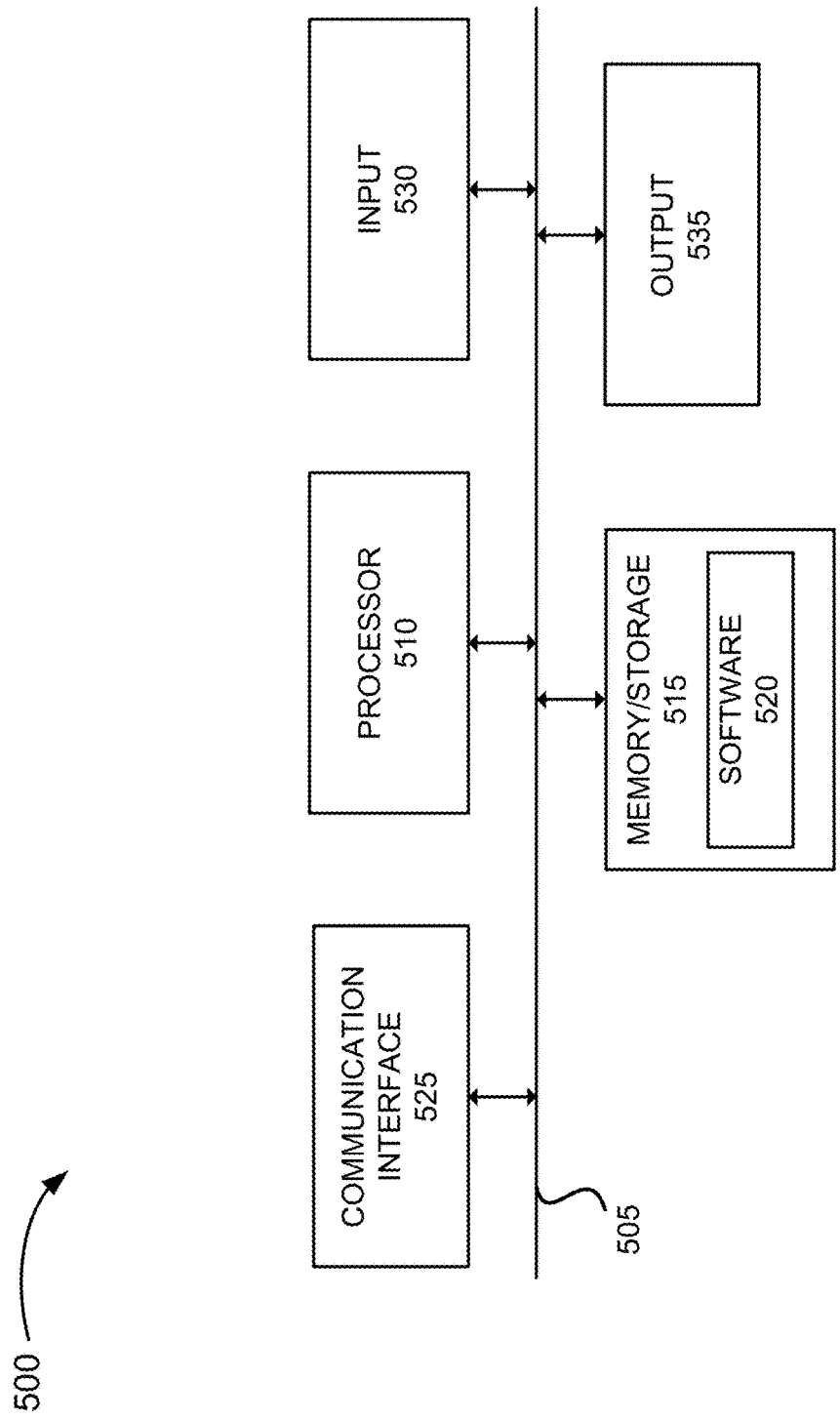
FIG. 5 is a diagram illustrating exemplary components of a device that may correspond to one or more of the devices illustrated and described herein.

FIG. 5 is a diagram illustrating exemplary components of a device 500 that may be included in one or more of the devices described herein. For example, device 500 may correspond to components included in access devices 110, core devices 155, end device 180, gNB 207, eNB 211, MME 252, and AMF 262. As illustrated in FIG. 5, device 500 includes a bus 505, a processor 510, a memory/storage 515 that stores software 520, a communication interface 525, an input 530, and an output 535. According to other embodiments, device 500 may include fewer components, additional components, different components, and/or a different arrangement of components than those illustrated in FIG. 5 and described herein.

Bus 505 includes a path that permits communication among the components of device 500. For example, bus 505 may include a system bus, an address bus, a data bus, and/or a control bus. Bus 505 may also include bus drivers, bus arbiters, bus interfaces, clocks, and so forth.

Processor 510 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 510 may be implemented as hardware (e.g., a microprocessor, etc.), a combination of hardware and software (e.g., a SoC, an ASIC, etc.), may include one or multiple memories (e.g., cache, etc.), etc.

Processor 510 may control the overall operation or a portion of operation(s) performed by device 500. Processor 510 may perform one or multiple operations based on an operating system and/or various applications or computer programs (e.g., software 520). Processor 510 may access instructions from memory/storage 515, from other components of device 500, and/or from a source external to device 500 (e.g., a network, another device, etc.). Processor 510 may perform an operation and/or a process based on various techniques including, for example, multithreading, parallel processing, pipelining, interleaving, etc.

Memory/storage 515 includes one or multiple memories and/or one or multiple other types of storage mediums. For example, memory/storage 515 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 515 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 515 may include drives for reading from and writing to the storage medium.

Memory/storage 515 may be external to and/or removable from device 500, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 515 may store data, software, and/or instructions related to the operation of device 500.

Software 520 includes an application or a program that provides a function and/or a process. As an example, with respect to access device 110 (e.g., gNB 207, eNB 211, etc.), software 520 may include an application that, when executed by processor 510, provides a function of the multi-RAT voice management service, as described herein. Additionally, with reference to a network device of a core network (e.g., AMF 262, UDM 265, MME 252, etc.), software 520 may include an application that, when executed by processor 510, provides a function of the multi-RAT voice management service, as described herein. Software 520 may also include firmware, middleware, microcode, hardware description language (HDL), and/or other form of instruction. Software 520 may also be virtualized. Software 520 may further include an operating system (OS) (e.g., Windows, Linux, Android, proprietary, etc.).

Communication interface 525 permits device 500 to communicate with other devices, networks, systems, and/or the like. Communication interface 525 includes one or multiple wireless interfaces and/or wired interfaces. For example, communication interface 525 may include one or multiple transmitters and receivers, or transceivers. Communication interface 525 may operate according to a protocol stack and a communication standard. Communication interface 525 may include an antenna. Communication interface 525 may include various processing logic or circuitry (e.g., multiplexing/de-multiplexing, filtering, amplifying, converting, error correction, application programming interface (API), etc.). Communication interface 525 may be implemented as a point-to-point interface, a service based interface, etc.

Input 530 permits an input into device 500. For example, input 530 may include a keyboard, a mouse, a display, a touchscreen, a touchless screen, a button, a switch, an input port, speech recognition logic, and/or some other type of visual, auditory, tactile, etc., input component. Output 535 permits an output from device 500. For example, output 535 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 500 may be implemented in the same manner. For example, device 500 may be instantiated, spun up, spun down, or undergo a life-cycle, using well-known virtualization techniques in a public/private cloud or other type of network.

Device 500 may perform a process and/or a function, as described herein, in response to processor 510 executing software 520 stored by memory/storage 515. By way of example, instructions may be read into memory/storage 515 from another memory/storage 515 (not shown) or read from another device (not shown) via communication interface 525. The instructions stored by memory/storage 515 cause processor 510 to perform a process described herein. Alternatively, for example, according to other implementations, device 500 performs a process described herein based on the execution of hardware (processor 510, etc.).

Figure 6:
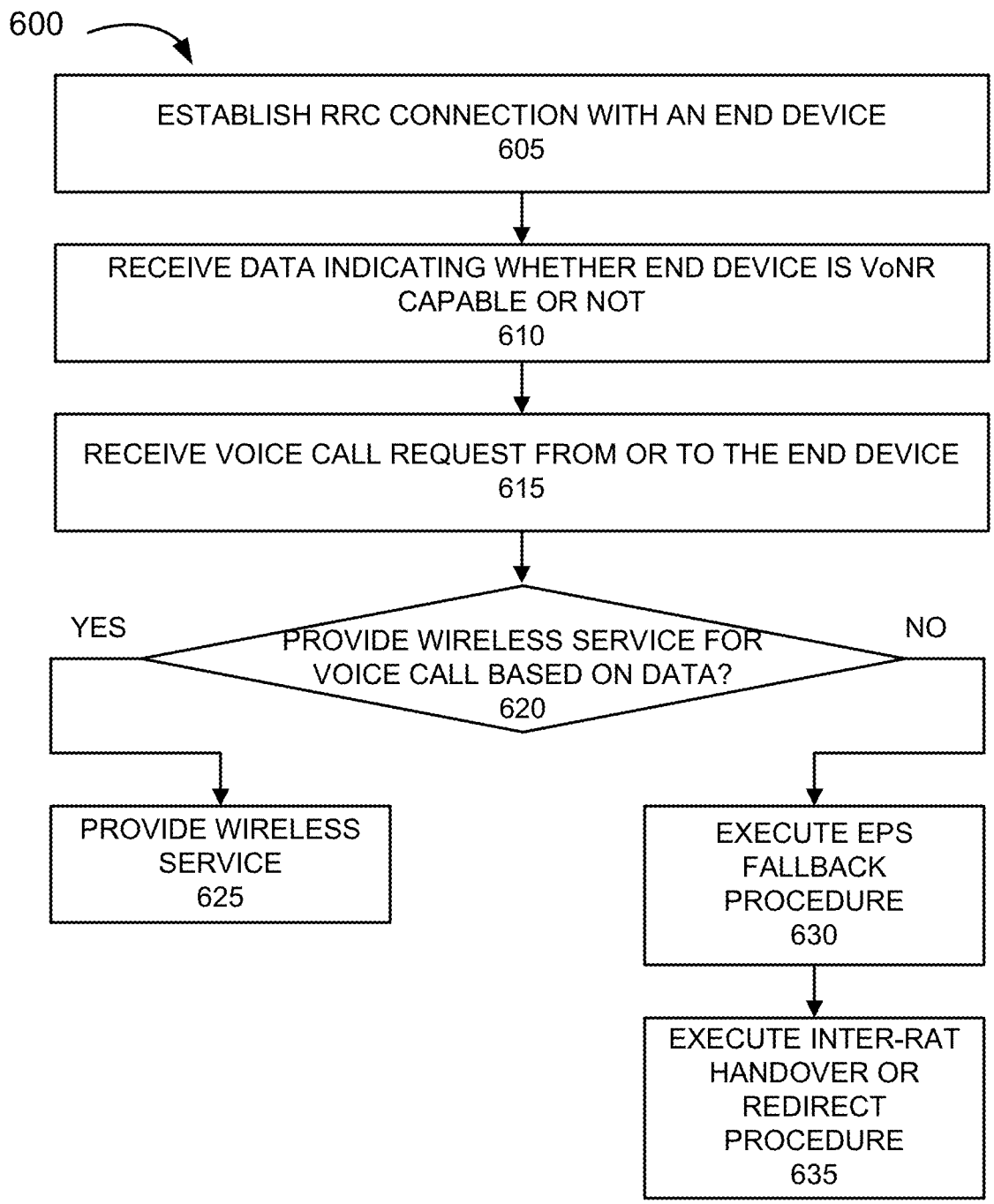
FIG. 6 is a flow diagram illustrating an exemplary process of an exemplary embodiment of the multi-RAT voice management service.

FIG. 6 is a flow diagram illustrating an exemplary process 600 of an exemplary embodiment of the multi-RAT voice management service. According to an exemplary embodiment, a network device of a RAN performs steps of process 600. For example, the network device may be a gNB. Additionally, for example, processor 510 may execute software 520 to perform a step illustrated in FIG. 6 and described herein. Additionally, or alternatively, a step illustrated in FIG. 6 may be performed by execution of only hardware.

In block 605, an RRC Connection may be established with an end device. For example, gNB 207 may establish an RRC Connection with end device 180 based on the execution of an RRC Connection Establishment procedure.

In block 610, data indicating whether end device is VoNR capable or not may be received. For example, gNB 207 may receive voice management data from a network device or core network 260 as a part of an attachment or registration procedure in relation to end device 180 and core network 260. According to an exemplary implementation, gNB 207 receives the voice management data from AMF 262.

In block 615, a voice call request from or to the end device may be received. For example, gNB 207 may receive a message to establish a voice call (MO or MT) with end device 180.

In block 620, it may be determined whether to provide wireless service for the voice call based on the data. For example, gNB 207 may use the voice management data, which indicates whether end device 180 is VoNR capable, to determine whether to provide wireless service in support of the voice call.

When it is determined to provide wireless service for the voice call (block 620—YES), wireless service may be provided (block 625). For example, when the voice management data indicates that end device 180 is VoNR capable, gNB 207 may provide wireless service in support of the voice call. Process 600 may end.

When it is determined to not provide wireless service for the voice call (block 620-NO), an EPS fallback procedure may be performed (block 630). For example, when the voice management data indicates that end device 180 is non-VoNR capable, gNB 207 may execute an EPS voice fallback procedure. The EPS voice fallback procedure may include the voice management data being provided to EPC network 250 and eNB 211.

In block 635, an inter-RAT handover or redirect procedure may be performed. For example, gNB 207 may perform an inter-RAT handover or redirect procedure relative to end device 180 and eNB 211.

FIG. 6 illustrates an exemplary process 600 of the multi-RAT voice management service. However, according to other embodiments, process 600 may include additional operations, fewer operations, and/or different operations than those illustrated in FIG. 6, and described herein. For example, gNB 207 may analyze the voice management data, but a preference is indicated therein that non-VoNR is preferred. In this regard, despite end device 180 being VoNR capable, gNB 207 may perform blocks 630 and 635. Additionally, as previously described, end device 180 may be both VoNR and non-VoNR capable. According to some exemplary implementations, the voice management data may indicate dual capabilities, but without a preference. gNB 207 may be configured with logic to determine whether EPS voice fallback and inter-RAT handover/redirect is to be performed based on RAN state (e.g., current or predictive congestion level at gNB 207, etc.), mobility factors associated with end device 180, a measurement report from end device 180, or other context information.

Figure 7:
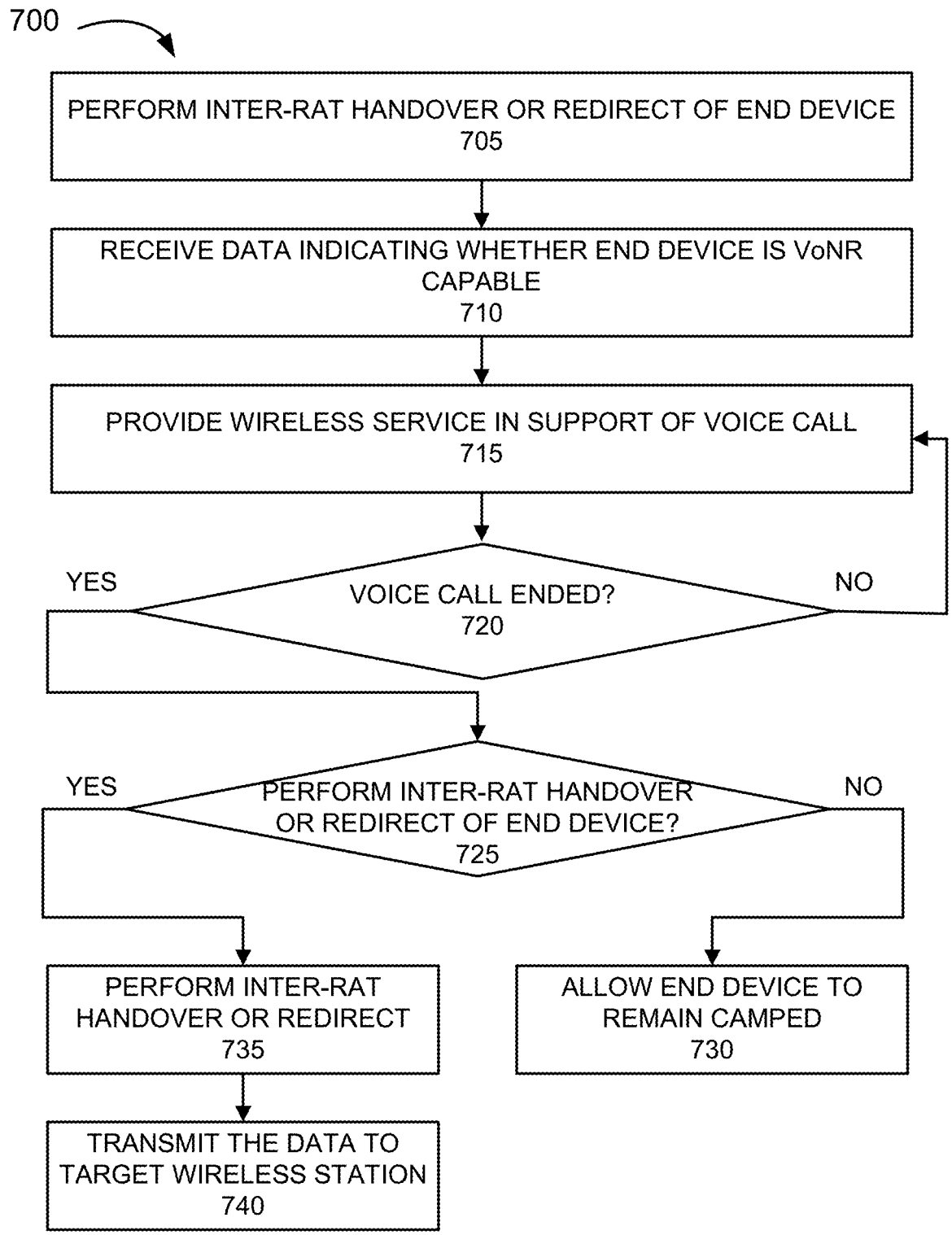
FIG. 7 is a flow diagram illustrating an exemplary process of another exemplary embodiment of the multi-RAT voice management service.

FIG. 7 is a flow diagram illustrating another exemplary process 700 of an exemplary embodiment of the multi-RAT voice management service. According to an exemplary embodiment, a network device of access network 105 performs steps of process 700. For example, the network device may be an eNB or another type of wireless station that is not of a 5G or future generation RAN. Additionally, for example, processor 510 may execute software 520 to perform a step illustrated in FIG. 7 and described herein. Additionally, or alternatively, a step illustrated in FIG. 7 may be performed by execution of only hardware.

In block 705, an inter-RAT handover or redirect procedure may be performed. For example, eNB 211 may perform the inter-RAT handover or redirect procedure relative to gNB 207 and end device 180. By way of further example, the inter-RAT handover or redirect procedure may be initiated by gNB 207, as previously described in relation to process 600.

In block 710, data indicating whether end device is VoNR capable may be received. For example, eNB 211 may receive voice management data from MME 252 as a part of an EPS voice fallback procedure or other type of core network procedure. The voice management data may indicate that end device 180 is non-VoNR capable. Alternatively, the voice management data may indicate that end device 180 has indicated a preference for non-VoNR service.

In block 715, wireless service in support of a voice call may be provided. For example, eNB 211 may provide wireless service to end device 180 in support of a voice call that formed the basis of the inter-RAT handover or redirect. Additionally, eNB 211 may omit to perform an inter-RAT handover or redirect with a gNB (e.g., gNB 207 or another gNB (not illustrated)), despite receiving a report of suitable 5G coverage.

In block 720, it may be determined whether the voice call has ended. For example, eNB 211 may monitor the voice call session to determine when the voice call session ends.

When it is determined that the voice call has not ended (block 720-NO), process 700 may continue to provide wireless service in support of the voice call (block 715).

When it is determined that the voice call has ended (block 720—YES), it may be determined whether to perform an inter-RAN handover or redirect of the end device (block 725). For example, based on a measurement report from end device 180, which may indicate whether suitable 5G coverage is available, eNB 211 may determine whether to perform the inter-RAT handover or redirect to a suitable gNB 207.

When it is determined that an inter-RAT handover or redirect is not to be performed (block 725—NO), the end device may be allowed to remain camped (block 730). For example, if eNB 211 determines that end device 180 does not have suitable 5G coverage, eNB 211 may allow end device 180 to remain camped with eNB 211.

When it is determined that an inter-RAT handover or redirect is to be performed (block 725—YES), the inter-RAT handover to redirect is performed (block 735). For example, if eNB 211 determines that end device 180 has suitable 5G coverage, eNB 211 may perform the inter-RAT handover or redirect relative to end device 180 and a target gNB.

In block 740, the data may be transmitted to a target wireless station. For example, eNB 211 may transmit the voice management data to the target gNB 207.

FIG. 7 illustrates an exemplary process 700 of the multi-RAT voice management service. However, according to other embodiments, process 700 may include additional operations, fewer operations, and/or different operations than those illustrated in FIG. 7, and described herein. For example, when suitable 5G coverage is available, eNB 211 may perform the inter-RAT handover or redirect when end device 180 is in idle mode or in active mode relative to a non-voice session. Additionally, as previously described, end device 180 may be both VoNR and non-VoNR capable. According to some exemplary implementations, the voice management data may indicate dual capabilities, but without a preference. eNB 211 may be configured with logic to determine whether inter-RAT handover/redirect is to be performed based on RAN state (e.g., current or predictive congestion level at eNB 211), mobility factors associated with end device 180, a measurement report from end device 180, or other context information.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to processes illustrated in FIGS. 6 and 7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 510, etc.), or a combination of hardware and software (e.g., software 520).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 510) of a device. A non-transitory storage medium includes one or more of the storage mediums described in relation to memory/storage 515.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
   establishing, by a network device of a radio access network of a first radio access technology (RAT), a radio connection with an end device;
   receiving, by the network device, data indicating whether the end device is capable of voice services using the first RAT;
   storing, by the network device, the data;
   receiving, by the network device subsequent to the storing of the data, a voice call request from or to the end device;
   determining, by the network device based on the data, whether to provide wireless service in support of the voice call; and
   executing, by the network device in response to determining to not provide wireless service in support of the voice call, an inter-RAT fallback procedure.

2. The method of claim 1, wherein RAT Frequency Selection Priority (RFSP) data includes the data and indicates RAT capabilities and RAT preferences of the end device.

3. The method of claim 1, wherein receiving the data comprises:
   receiving, by the network device from a device of a core network of the first RAT, the data in a subscriber profile identifier information element.

4. The method of claim 1, further comprising:
   executing, by the network device in response to determining to not provide wireless service in support of the voice call, an inter-RAT handover or redirect procedure in relation to a network device of a radio access network of a second RAT.

5. The method of claim 4, wherein the first RAT is new radio (NR) and the second RAT is Long Term Evolution.

6. The method of claim 1, wherein the data indicates that the end device is not capable of voice services using the first RAT.

7. The method of claim 1, wherein the network device is a next generation Node B.

8. The method of claim 1, wherein the data indicates that the end device is capable of voice services using the first RAT, and wherein the data further indicates a preference to not use the first RAT for voice services.

9. A network device comprising:
   a communication interface;
   a memory, wherein the memory stores instructions; and
   a processor, wherein the processor executes the instructions to:
   establish, via the communication interface, a radio connection with an end device, wherein the network device is of a radio access network of a first radio access technology (RAT);
   receive data indicating whether the end device is capable of voice services using the first RAT;
   store the data;
   receive, subsequent to storage of the data, a voice call request from or to the end device;
   determine, based on the data, whether to provide wireless service in support of the voice call; and
   execute, in response to a determination to not provide wireless service in support of the voice call, an inter-RAT fallback procedure.

10. The network device of claim 9, wherein RAT Frequency Selection Priority (RFSP) data includes the data and indicates RAT capabilities and RAT preferences of the end device.

11. The network device of claim 9, wherein, when receiving the data, the processor further executes the instructions to:
    receive, via the communication interface from a device of a core network of the first RAT, the data in a subscriber profile identifier information element.

12. The network device of claim 9, wherein the processor further executes the instructions to:
    execute, in response to the determination to not provide wireless service in support of the voice call, an inter-RAT handover or redirect procedure in relation to a network device of a radio access network of a second RAT.

13. The network device of claim 12, wherein the first RAT is new radio (NR) and the second RAT is Long Term Evolution.

14. The network device of claim 9, wherein the data indicates that the end device is not capable of voice services using the first RAT.

15. The network device of claim 9, wherein the network device is a next generation Node B (gNB).

16. The network device of claim 9, wherein the data indicates that the end device is capable of voice services using the first RAT, and wherein the data further indicates a preference to not use the first RAT for voice services.

17. A non-transitory computer-readable storage medium storing instructions executable by a processor of a network device, which when executed cause the network device to:
    establish a radio connection with an end device, wherein the network device is of a radio access network of a first radio access technology (RAT);
    receive data indicating whether the end device is capable of voice services using the first RAT;
    store the data;
    receive, subsequent to storage of the data, a voice call request from or to the end device;
    determine, based on the data, whether to provide wireless service in support of the voice call; and
    execute, in response to a determination to not provide wireless service in support of the voice call, an inter-RAT fallback procedure.

18. The non-transitory computer-readable storage medium of claim 17, wherein RAT Frequency Selection Priority (RFSP) data includes the data and indicates RAT capabilities and RAT preferences of the end device.

19. The non-transitory computer-readable storage medium of claim 17, wherein the data indicates that the end device is not capable of voice services using the first RAT.

20. The non-transitory computer-readable storage medium of claim 17, wherein the network device is a next generation Node B (gNB), and wherein the instructions further comprise instructions, which when executed cause the gNB to:
   execute, in response to the determination to not provide wireless service in support of the voice call, an inter-RAT handover or redirect procedure in relation to a network device of a radio access network of a second RAT.

\* \* \* \* \*